United States Patent [19]
Kitano et al.

[11] 3,934,358
[45] Jan. 27, 1976

[54] DRIVE APPARATUS FOR INDEPENDENTLY CHANGING THE PHASE OF THE MOON FOR PLANETARIUM

[75] Inventors: Naohiko Kitano; Katsumi Haseda; Tamotsu Takahashi, all of Toyokawa, Japan

[73] Assignee: Minolta Camera Kabushiki Kaisha, Osaka, Japan

[22] Filed: Nov. 15, 1974

[21] Appl. No.: 524,298

[30] Foreign Application Priority Data
Nov. 26, 1973 Japan.............................. 48-133302

[52] U.S. Cl. ................................................ 35/42.5
[51] Int. Cl.² ........................................ G09B 27/00
[58] Field of Search ..................................... 35/42.5

[56] References Cited
UNITED STATES PATENTS

| | | | |
|---|---|---|---|
| 2,827,830 | 3/1958 | Vaux et al. | 35/42.5 |
| 3,312,142 | 4/1967 | Shistovsky | 35/42.5 |
| 3,571,954 | 3/1971 | Frank | 35/42.5 |
| 3,574,955 | 4/1971 | Skolnick | 35/42.5 |

*Primary Examiner*—Wm. H. Grieb
*Attorney, Agent, or Firm*—Wolder & Gross

[57] ABSTRACT

Apparatus comprising a moon projector including an element for changing the phase of the moon, a gear system for transmitting a drive force to the moon phase changing element, a drive system for annual motion, a drive system for independently changing the phase of the moon provided independently of the annual motion drive system, differential gear means for selectively transmitting the operation of the annual motion drive system or of the drive system for independently changing the moon phase to the drive force transmitting gear system, and switching means for selectively operating the annual motion drive system or the drive system for independently changing the moon phase, whereby changes in the lunar phase as related to annual motion or changes in the lunar phase independent thereof can be selectively projected without impairing the continuous changing mode of the lunar phase.

2 Claims, 6 Drawing Figures

3,934,358

DRIVE APPARATUS FOR INDEPENDENTLY CHANGING THE PHASE OF THE MOON FOR PLANETARIUM

BACKGROUND OF THE INVENTION

The present invention relates to a drive apparatus for independently changing the phase of the moon for use in a planetarium, more particularly to a drive apparatus for changing the phase of the moon selectively as related to annual motion or independently thereof.

Generally to continuously project the changing lunar phase by a planetarium, the image of the moon projected onto the dome is moved from west to east or from east to west through an angle required for the cycle of the lunar phases. In other words, the moon image is brought into annual motion. However, since the dome of planetarium represents only the upper half of the celestial sphere for observation, it is impossible to demonstrate the changes in the moon phase during the travel of the moon beneath the horizon of the celestial sphere.

In order to represent one complete cycle of the lunar phases on the dome of a limited area, stars other than the moon, namely the sun, Saturn, Mercury, Venus, Mars, Jupiter and the like planets and fixed stars to be projected by the star globe must be moved in the reverse direction for diurnal motion at the same velocity as the angular velocity of the moon as it travels on the celestial sphere so as to offset the increase of right ascension of the moon itself with the reverse diurnal motion. Otherwise it would be impossible to project a continuously waxing and waning moon image onto the dome.

It is seen from FIG. 1 that when the planetarium projector is operated for annual motion, the position of moon image continuously changes with respect to right ascension along the moon's path, since the moon travels along its orbit in the direction of the arrow A as time elapses while waxing and waning. Furthermore when the intersection of the moon's orbit and the ecliptic coincides with or is positioned close to the vernal equinox as illustrated in FIG. 1, the moon's path forms an angle of inclination of $23°27' + 5°9' = 28°36'$ with the celestial equator. Accordingly, even if the increase of right ascension of the moon is offset by the reverse diurnal motion in an attempt to project the image of the moon at a fixed position, the annual motion of the moon takes place reciprocally in the direction of declination in the range of from $28°36'$ north to $28°36'$ south, namely over the entire range of $57°12'$ in declination. Thus even if the increase in the right ascension involved in the annual motion of the moon in the northern hemisphere can be cancelled by the reverse diurnal motion, it is also necessary to cause a latitude changing motion as related to the reverse diurnal motion. This makes the planetarium complex in construction and cumbersome to operate and changes the relative positions of the sun, Saturn, Mercury, Venus, Mars, Jupiter and like planets to be projected by the projectors which are adapted to be operated commonly by the drive shaft for producing the annual motion of the moon and for changing the lunar phase. After operation, furthermore, there arises the necessity to return the moon, sun and five great planets to the original positions and to restore the original diurnal motion.

Accordingly it is difficult even for a skillful operator to operate the planetarium in the above-mentioned manner as smoothly as is desired for educational and general purposes.

In view of the foregoing problems, a planetarium has been provided which is equipped with a moon projector operatively related to an annual motion mechanism and another projector for projecting moon phases independently of the annual motion mechanism so as to simplify the construction and operation. With such planetarium changes in the moon phase are reproduced by the former projector, and when the moon phases are to be projected by the independent projector, annual motion is stopped, simultaneously turning on the latter projector and bringing the former projector out of operation. Alternatively, the latter projector is turned on for projection independently of the moon phase projected by the former projector.

Thus the known planetarium requires two moon projectors and drive means therefor. Moreover when the projection of lunar phases in operative relation to the moon's annual motion is switched to the projection of moon phases independent of the annual motion, the lunar phase to be projected by the independent projector upon switching must be brought into conformity, solely by the knack of the operator, with the lunar phase previously projected by the annual motion-related moon projector just before it is turned off. Such operation is very troublesome, possibly entailing a discrepancy in the lunar phase. When the independent moon phase projector is turned on for projection independently of the moon phase projected by the annual motion-associated moon projector, no consideration is given to ensure coincidence between the two moon phases, with the result the discrepant lunar phases give an unnatural impression to the observer.

SUMMARY OF THE INVENTION

An object of this invention is to utilize one moon projector commonly both for projecting the phases of the moon as related to usual annual motion and for projecting the phases of the moon independently thereof so that the changes in the lunar phase during annual motion and changes in the lunar phase independent thereof can be projected by a simple switching operation without impairing the continuous changing mode of the lunar phase to thereby eliminate unnaturalness owing to the discontinuity to be otherwise involved in the changing mode of the lunar phase upon switching operation.

Another object of this invention is to provide an apparatus for permitting the switching operation with extreme ease.

Still another object of this invention is to commonly use the moon projector as stated above to thereby simplify the drive means therefor and the construction of planetarium.

The apparatus of this invention comprises a moon projector including an element for changing the phase of the moon, a gear system for transmitting a drive force to the moon phase changing element, a drive system for annual motion, a drive system for independently changing the phase of the moon provided independently of the annual motion drive system, differential gear means interposed between the gear system and the drive systems to selectively transmit the operation of the annual motion drive system or of the moon phase independently changing drive system to the gear system for selectively operating the annual motion drive system or the moon phase independently changing drive system.

The switching means comprises a selecting switch for selectively connecting a power source to a motor for driving the annual motion drive system or to a motor for driving the drive system for independently changing the moon phase. The moon phase changing element is therefore driven by the annual motion drive system or by the drive system for independently changing the moon phase by way of the differential gear means. Consequently, the switching operation can be effected without any difficulty and without producing any discrepancy between the two lunar phases immediately before and after the switching operation.

According to this invention, all the lunar phases which it is impossible to project, in operative relation to annual motion, onto the limited area of the dome, namely over the area of the northern hemisphere in FIG. 1, can be reproduced entirely independently of the projectors other than the moon projector and other motion mechanisms, by switching the projection of the lunar phases as related to annual motion to the projection of the lunar phases independent thereof. Thus the present invention has eliminated such disadvantage that various other motion means e.g. projectors for the sun, Saturn, Mercury, Venus, Mars, and Jupiter as well as mechanisms therefor must be returned to the original state after the projection of the independently changing moon phase. In fact it is possible for the present apparatus to represent the phases of the moon in accordance with the positions of the stars during spring, summer, autumn and winter and also to project one complete cycle of lunar phases with the image of moon projected onto the dome at one desired fixed point thereof.

Since the two modes of projection are performed by only one moon projector, the apparatus is very simple in its overall construction, whilst the projection of lunar phases related to annual motion can be switched to the projection of the lunar phases independent thereof, and vice versa by a simple switching operation. Even when such switching operation is made without giving any attention to the other mechanisms, the final phase of the moon displayed by one mode of projection is continuous with the phase of the moon subsequently reproduced by the other mode of projection, without any discrepancy between the two phases. The present apparatus no longer necessitates the procedure to restore its mechanism to the original state after the completion of projection of independent changes of the moon phase but permits a smooth and quick switching operation and is therefore very useful for the demonstration of the celestial bodies by the planetarium which must be performed smoothly within a limited period of time for students and general audience.

Other objects and advantages of this invention will become more apparent from the following description.

DESCRIPTION OF THE PREFERRED EMBODIMENT

Figure 1:
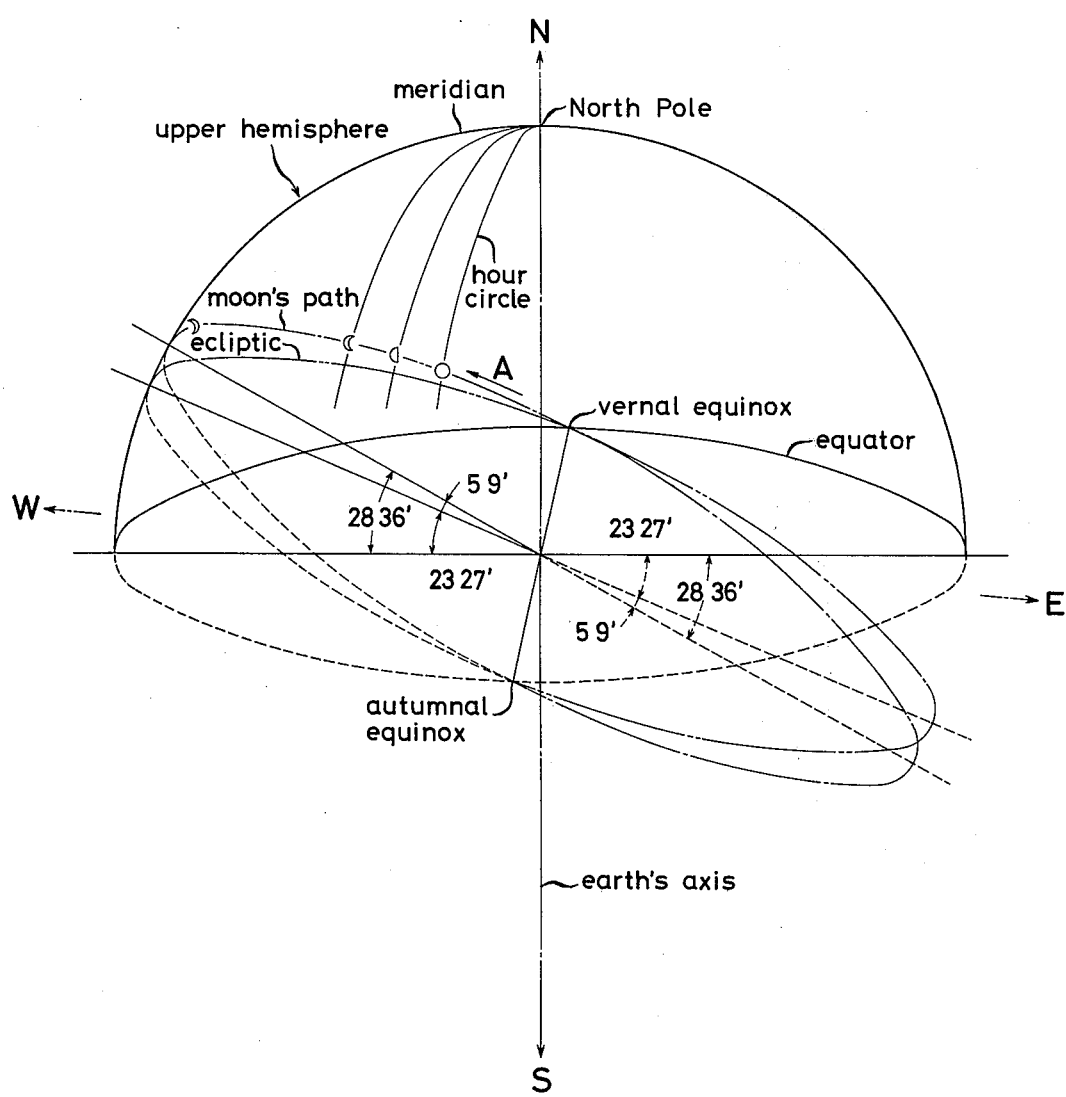
FIG. 1 is a diagram showing the celestial sphere to be projected onto the dome of planetarium.
Figure 2:
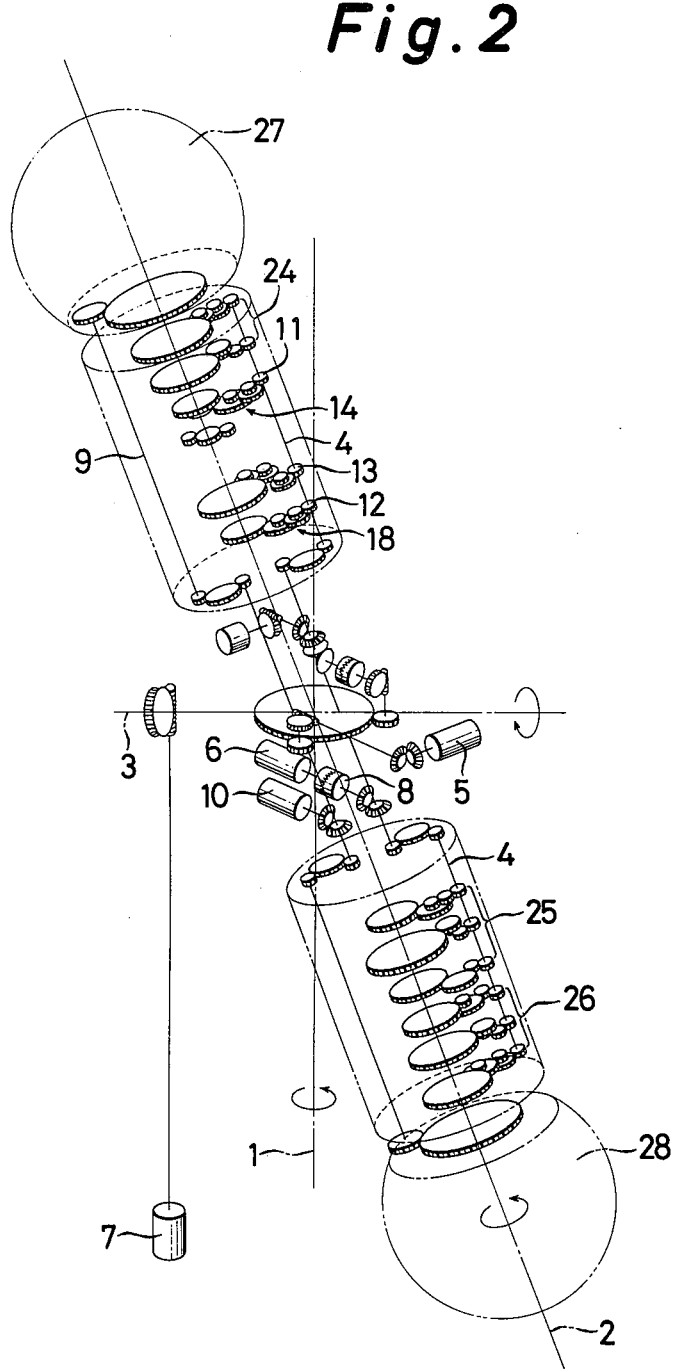
FIG. 2 is a perspective view schematically showing the drive mechanism for a conventional planetarium.

FIG. 2 is a perspective view schematically showing the drive mechanism of conventional planetarium which is not equipped with independent moon phase projecting means. The figure shows a shaft 1 for diurnal motion, shaft 2 for precession motion, latitude changing shaft 3, drive shaft 4 for annual motion, drive motor 5 for diurnal motion, drive motor 6 for annual motion, drive motor 7 for changing latitude, diurnal-annual motion addition unit 8, drive shaft 9 for precession motion, drive motor 10 for precession motion, drive gear 11 for changing the phase of the moon, drive gear 12 for the annual motion of the moon, and drive gear 13 for nodal regression of the moon's orbit.

Figure 3:
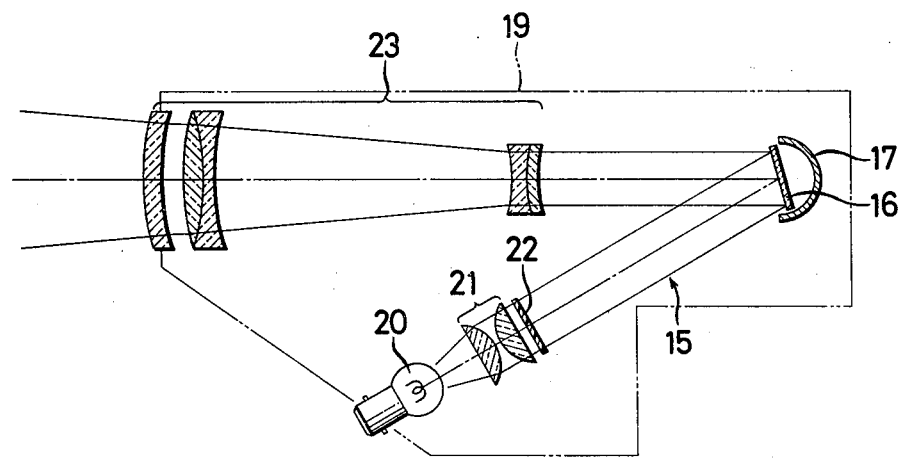
FIG. 3 is a plan view showing an example of optical projecting system of a moon projector.

The drive gear 11 for changing the moon phase is mounted on the annual motion drive shaft 4 and, by way of a gear system 14, drives an element 17 for changing the phase of the moon provided in combination with a reflecting mirror 16 including in a moon projecting optical system 15 shown in FIG. 3. The moon phase changing element 17 is driven in operative relation to the annual motion. Likewise the drive gear 12 for the moon's annual motion is mounted on the annual motion drive shaft 4 and, by way of a gear system 18 for transmitting the annual motion, drives a moon projector 19 including the moon projecting optical system 15 to bring the moon image into annual motion as projected onto a dome. FIG. 3 shows a light source 20 for the moon projecting optical system 15, a condenser 21, a plate 22 of photograph of the moon, and a projecting lens system 23.

Figure 4:
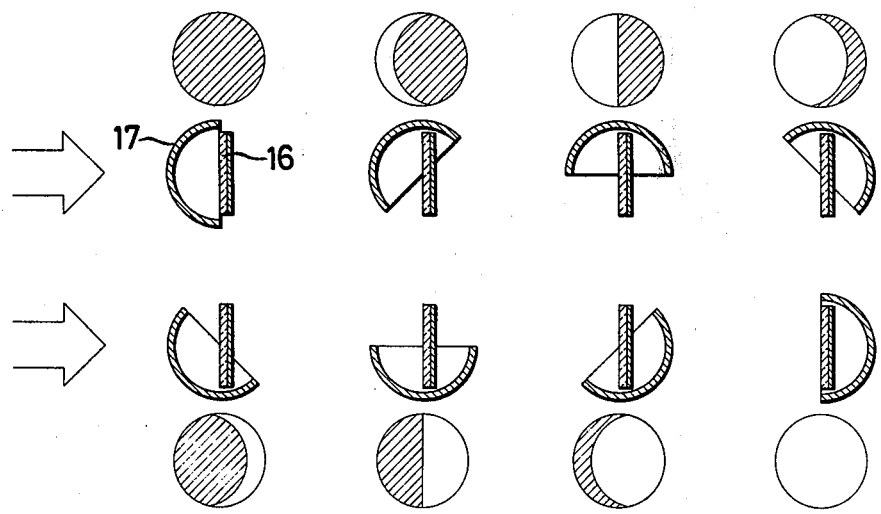
FIG. 4 is a diagram illustrating the exemplary relation between the position of a moon phase changing element included in the moon projector and the phase of the projected moon image.

When driven by the gear system 14 for transmitting a drive force to the moon phase changing element 17, the element 17 turns around the reflecting mirror 16, shifting relative to the reflecting mirror 16 as illustrated in FIG. 4 to reproduce the image of the moon during waxing and waning.

In addition to the gears 11, 12 and 13, further mounted on the annual motion drive shaft 4 are drive gears 24 for the Saturn and sun, drive gears 25 for the Mercury and Venus, drive gears 26 for the Mars and Jupiter, etc. to bring these heavenly bodies into annual motion.

The diurnal motion drive system, when driven, moves northern and southern fixed star globes 27 and 28 to shift the fixed stars projected onto the dome. Accordingly if it is attempted to project independent changes of the moon phase by one projector with the conventional apparatus described, problems arise in that the apparatus becomes complex in construction and difficult to operate.

Figure 5:
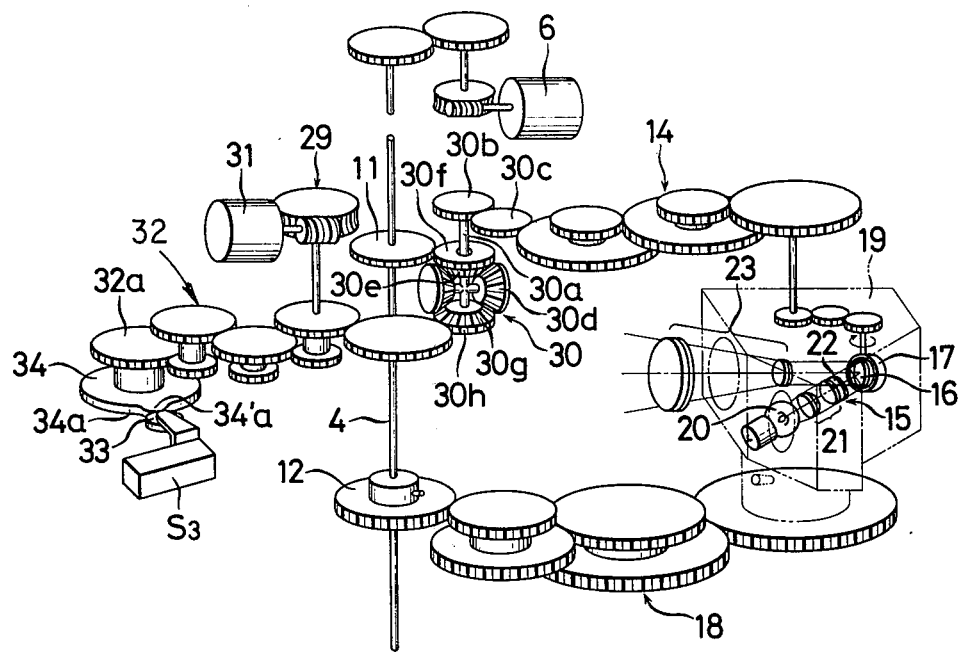
FIG. 5 is an enlarged perspective view showing the principal parts of an embodiment of this invention.

FIG. 5 shows a drive system 29 for independently changing the phase of the moon which is incorporated into a planetarium apparatus of the usual type in which the annual motion drive shaft 4 is operatively related to the gear system 18 for transmitting the moon's annual motion and to the gear system 14 for driving the moon phase changing element. The apparatus further includes differential gear means 30 by which the gear system 14 is operatively related to the moon phase changing drive gear 11 on the annual motion drive shaft 4 and to the drive system 29 for independently changing the moon phase. The moon phase changing element 17 is selectively driven by the drive gear 11 or drive system 29. The drive system 29 for independently changing the moon phase includes a drive motor 31 and a gear system 32.

Figure 6:
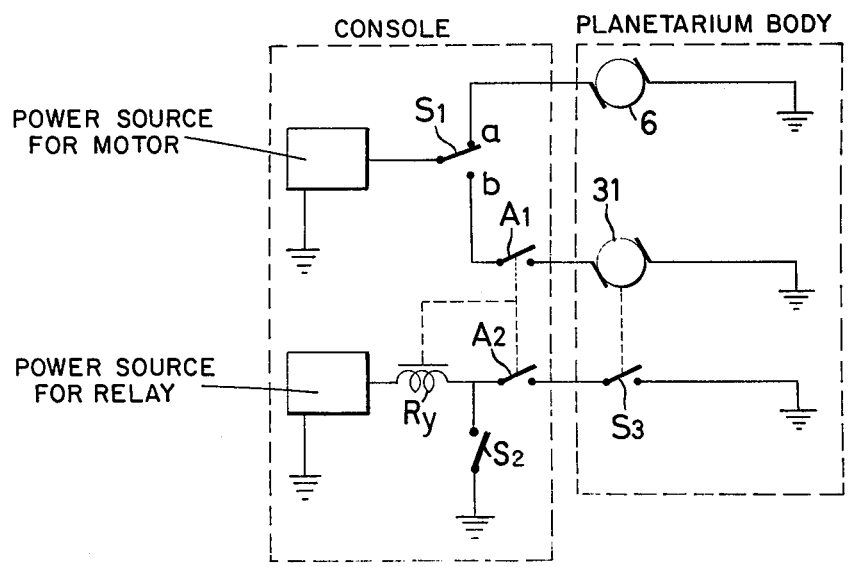
FIG. 6 is a diagram showing a switching circuit serving as switching means for selectively operating a drive system for annual motion and a drive system for independently changing the moon phase.

FIG. 6 shows a switching circuit for selectively projecting the phases of the moon as related to the moon's annual motion or projecting the phases of the moon independently thereof. When a selecting switch S1 is closed at a contact *a* for the drive motor 6 for annual motion as illustrated, the motor 6 is driven while the motor 31 for independently changing the moon phase is held unenergized. Accordingly the projected image of the moon does not change independently of the annual motion during that motion but the moon projector 19 is rotated in the direction of annual motion by the gear system 18 for transmitting the annual motion. Consequently the moon phase is changed by the moon phase changing drive gear 11, differential gear means 30 and the gear system 14 for driving the moon phase changing element which are associated with the annual motion of the moon.

When the selecting switch S1 is closed at a contact *b* for the drive motor 31 for independently changing the moon phase, the motor 6 for annual motion is deenergized. If another switch S2 is then closed, a relay Ry is energized to close switches A1 and A2.

Closing of the switch A1 energizes the drive motor 31, which in turn mechanically closes a switch S3. As a result, even if the switch S2 is thereafter opened, the closed switches A2 and S3 permit the relay Ry to be self-maintained. The switch S2 may be a usual push-button switch therefore. When the motor 31 has completely driven the moon phase changing element independently of the annual motion, the switch S3 is mechanically opened to further open the relay Ry, whereupon the switches A1 and A2 are opened. Consequently the motor 31 is deenergized to complete the independent change of the moon phase. The circuit described of course includes an unillustrated main switch which permits the foregoing operations only when closed.

FIG. 5 shows in detail an example of the mechanism for operating the switch S3 which is adapted to be mechanically closed and opened by the drive motor 31 for independently changing the moon phase.

The switch S3 has a driven member 33 which is in sliding contact with the cam surface 34*a* of a cam 34 included in the gear system 32 for transmitting a drive force to independently change the moon phase. The cam 34 is fixed to a gear 32*a* incorporated into the gear system 32 and adapted to make one turn of rotation during the period from the initiation of independent change of the lunar phase until the completion thereof. While the drive motor 31 is unenergized, a projection 34*a'* on the cam surface 34*a* is in pressing contact with the driven member 33, holding the switch S3 opened. Immediately after the motor 31 is energized, the projection 34*a'* relieves the driven member 33 of the pressure to close the switch S3 and to bring the relay Ry into selfmaintained state. Further upon completion of the independent change of the lunar phase, the projection 34*a'* presses the driven member 33 and opens the switch S3.

The differential gear means 30 includes an output shaft 30*a* and a gear 30*b* mounted on the shaft 30*a* and meshing it with an intermediate gear 30*c* which is associated with the gear system 14 for driving the moon phase changing element. Radially extending from the output shaft 30*a* integral therewith is an arm which rotatably carries planetary bevel gears 30*d*. Further idly rotatably supported by the output shaft 30*a* is a bevel gear 30*e* meshing with the planetary bevel gears 30*d* and joined with a gear 30*f* which meshes with the gear 11 for changing the moon phase on the annual motion drive shaft 4. The planetary bevel gears 30*d* also mesh with another bevel gear 30*g* which is likewise rotatably supported by the output shaft 30*a* and is integral with a gear 30*h*. The gear 30*h* meshes with the gear system 32. In this way the moon phase changing element 17 is adapted to be rotated selectively by the drive system for annual motion or by the drive system for independently changing the moon phase.

When the drive motor 6 for annual motion is driven, with the drive motor 31 held unenergized, the rotation of the drive gear 11 for changing the moon phase is delivered to the output shaft 30*a* by way of the gears 30*f*, 30*e* and planetary bevel gears 30*d*, while the bevel gear 30*g* is prevented from rotation as associated with the gear system 32. Via the gears 30*b* on the shaft 30*a*, intermediate gear 30*c* and gear system 14, the moon phase changing element 17 is therefore driven. On the other hand, the drive gear 12 for the moon's annual motion on the annual motion drive shaft 4 rotates, through the gear system 18, the moon projector 19 at a speed in conformity with the annual motion. Consequently, the image of the moon projected to the dome is given the annual motion and is changed in its phase in relation to the annual motion.

When the projected image of the moon has travelled over the limited area on the dome as projected thereto, the selecting switch S1 is opened at the contact *a* for the drive motor 6 for annual motion and is closed at the contact *b* for the motor 31, and the switch S2 is closed, whereupon the motor 6 is deenergized whilst the motor 31 is energized. This stops the annual motion drive shaft 4 and the gear 30*e* of the differential gear means 30. The moon projector 19 is also brought to a halt, with the result that the projected image of the moon stops on the dome. On the other hand, through the gear system 32, differential gear means 30 and gear system 14, the rotation of the drive motor 31 for independently changing the moon phase rotates the moon phase changing element 17 independently of the annual motion of the moon, changing the phase of the moon image projected onto the dome at a fixed position. Thus the phase of the moon image changes independently of the annual motion.

Since the independent change in the lunar phase is produced by bringing the moon phase changing element 17 into subsequent operation which element has been temporarily stopped by stopping the preceding annual motion, the phase of the moon image projected as related to the annual motion and the phase of the moon image subsequently projected independently thereof upon a switching operation are in complete agreement with each other, and there is no need to follow some other procedure. Thus the present apparatus in no way produces a discrepancy between the moon phases which would give an unnatural impression to the observer and is free of any difficulty in switching operation.

What is claimed is:

1. A planetarium apparatus comprising:

a moon projector including an element for changing the phase of the moon, the moon projector being operable to bring the image of the moon projected on a dome into annual motion when rotated by the operation of an annual motion drive shaft and to stop the image of the moon on the dome when the drive shaft stops, a gear system for transmitting a drive force to the moon phase changing element to drive the element, an annual motion drive system for driving the annual motion drive shaft, a drive system for independently changing the phase of the moon provided independently of the annual motion drive system, differential gear means so disposed as to selectively transmit the operation of the annual motion drive system or of the moon phase independently changing drive system to the gear system, and switching means for selectively operating the annual motion drive system or the moon phase independently changing drive system.

2. The planetarium apparatus as set forth in claim 1 wherein the annual motion drive system and the moon phase independently changing drive system are provided with independent drive motors respectively, and the switching means comprises a selecting switch for selectively connecting one of the independent drive motors to a power source therefor.

* * * * *